(12) United States Patent
Guo et al.

(10) Patent No.: US 9,778,512 B2
(45) Date of Patent: Oct. 3, 2017

(54) ARRAY SUBSTRATE HAVING SPACER, METHOD FOR MANUFACTURING THE SAME, AND DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jian Guo, Beijing (CN); Jiantao Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 229 days.

(21) Appl. No.: 14/388,677

(22) PCT Filed: Dec. 3, 2013

(86) PCT No.: PCT/CN2013/088463
§ 371 (c)(1),
(2) Date: Sep. 26, 2014

(87) PCT Pub. No.: WO2015/010410
PCT Pub. Date: Jan. 29, 2015

(65) Prior Publication Data
US 2016/0246097 A1    Aug. 25, 2016

(30) Foreign Application Priority Data
Jul. 23, 2013    (CN) .......................... 2013 1 0311647

(51) Int. Cl.
*G02F 1/1339* (2006.01)
*G02F 1/1333* (2006.01)
(Continued)

(52) U.S. Cl.
CPC ........ *G02F 1/13394* (2013.01); *G02F 1/1368* (2013.01); *G02F 1/133345* (2013.01);
(Continued)

(58) Field of Classification Search
CPC ......... H01L 21/31116; H01L 29/78696; H01L 21/3065
See application file for complete search history.

(56) References Cited

U.S. PATENT DOCUMENTS 5,534,716 A * 7/1996 Takemura ......... H01L 21/02672
257/59
7,125,805 B2 * 10/2006 Chen ................. H01L 29/66492
257/E21.345
(Continued)

FOREIGN PATENT DOCUMENTS

CN    101762916 A    6/2010
CN    103412444 A    11/2013

OTHER PUBLICATIONS

International Search Report Appln. No. PCT/CN2013/088463; Dated Apr. 22, 2014.
(Continued)

*Primary Examiner* — Marc Armand
*Assistant Examiner* — Shannon Yi
(74) *Attorney, Agent, or Firm* — Ladas & Parry LLP

(57) ABSTRACT

A method for manufacturing an array substrate includes steps of: forming a pattern which includes a scanning line and a gate on a base substrate (301); forming a gate insulating layer on the pattern which includes the scanning line and the gate; forming a pattern which includes an active layer, a data line and a spacer matrix on the gate insulating layer; forming a passivation layer on the pattern which includes the active layer, the data line and the spacer matrix; dry etching the passivation layer to form a via hole which
(Continued)

exposes the spacer matrix; under effect of an electric field generated between the spacer matrix exposed from the via hole and an etching gas, products obtained during the etching is induced to be deposited on the exposed surface of the spacer matrix so as to form a spacer. An array substrate and a display pane are further provided.

19 Claims, 3 Drawing Sheets

(51) Int. Cl.
    *G02F 1/1362*    (2006.01)
    *G02F 1/1368*    (2006.01)
(52) U.S. Cl.
    CPC ............... *G02F 1/136286* (2013.01); *G02F 2001/13398* (2013.01); *G02F 2001/136295* (2013.01); *G02F 2201/503* (2013.01)

(56) References Cited

U.S. PATENT DOCUMENTS

| | | | | |
|---|---|---|---|---|
| 7,163,848 B2* | 1/2007 | Yamazaki | ............... | H01L 27/12 257/72 |
| 2006/0285060 A1* | 12/2006 | Misaki | ................ | G02F 1/13394 349/156 |
| 2007/0212618 A1* | 9/2007 | Yoshikawa | ............... | G03F 1/32 430/5 |
| 2009/0061573 A1* | 3/2009 | Miyairi | ................... | H01L 29/04 438/160 |
| 2010/0092888 A1* | 4/2010 | Buchine | .................. | H01L 29/34 430/296 |
| 2012/0092596 A1* | 4/2012 | Cho | .................... | G02F 1/13394 349/106 |
| 2013/0068297 A1* | 3/2013 | Xia | ......................... | C30B 29/06 136/256 |
| 2013/0342781 A1* | 12/2013 | Lee | ....................... | G02F 1/1368 349/46 |

OTHER PUBLICATIONS

Written Opinion of the International Searching Authority dated Apr. 22, 2014; PCT/CN2013/088463.

* cited by examiner

ARRAY SUBSTRATE HAVING SPACER, METHOD FOR MANUFACTURING THE SAME, AND DISPLAY PANEL

TECHNICAL FIELD

Embodiments of the present invention relate to the field of liquid crystal display technology, particularly to an array substrate, a method for manufacturing the same, and a display panel.

BACKGROUND

With the development of the Thin Film Transistor Liquid Crystal Displays (TFT-LCDs) and the improvement of industrial technology, liquid crystal display technology has taken the place of Cathode Ray Tube (CRT) display technology and dominates the display field in the daily life. With development of the stereoscopic display technology, improving the display quality becomes more and more important, such as reducing color cast, reducing stereoscopic cross-talk and picture blink, increasing visual angle, and so on.

Advanced Super Dimension Switch (ADS) liquid crystal display technology has become a mainstream technology. The ADS is core technology of in-plane electric field type wide-viewing-angle displays. In the ADS technology, a multi-dimensional electric field is formed with both an electric field produced at edges of slit electrodes on the same plane and an electric field produced between a slit electrode layer and a plate electrode layer, so that liquid crystal molecules at all orientations, which are located directly above the slit electrodes and between the slit electrodes in a liquid crystal cell, can be rotated and aligned, which enhances the work efficiency of liquid crystals and increases light transmittance. The ADS technology can improve the picture quality of TFT-LCDs and has advantages of high definition, high transmissivity, low power consumption, wide viewing angles, high opening ratio, low chromatic aberration, no push Mura, etc. This technology is widely used in the display screens of senior-level mobile phone, mobile production, television set and the like. A color filter, which has a significant effect in display quality, is an indispensable component of a liquid crystal display panel. FIG. 1 is a view schematically illustrating a liquid crystal display panel in conventional technology. As shown in FIG. 1, the display panel comprises a color filter substrate 11, an array substrate 12 and a liquid crystal layer 13 disposed between the color filter substrate 11 and the array substrate 12. A spacer 110 is disposed on the color filter substrate 11. The height of the spacer 110, designed according to demand, is about 2-3 μm. The spacer is used to maintain the cell gap between the substrates and prevent abnormal display caused by deformation of the liquid crystal. In conventional technology, the spacer used to maintain the cell gap is fabricated by photolithography. The process for fabricating the spacer comprises steps of coating a photosensitive material on surface of the color filter substrate and forming the spacer by exposure and development. Currently, in the process for fabricating the spacer, the photoresist is typically patterned by exposure via a gray mask or semitransparent mask. Because the hardness of the resin material constituting the photoresist is low, the spacer fabricated by conventional technology is prone to be broken. Thus, the broken spacer can not provide support for the substrates, and the liquid crystals surrounding the broken spacer are deformed. As a result, the degraded display, even abnormal display, occurs in the liquid crystals display.

SUMMARY

Embodiments of the invention provide an array substrate, a method for manufacturing the same and a display panel, which prevent the degraded display resulted from the broken spacer in conventional technology and improve the display effect of the liquid crystal display device.

According to a first aspect of the invention, there is provided a method for manufacturing an array substrate comprising:

forming a pattern which comprises a scanning line and a gate;

forming a gate insulating layer on the pattern which comprises the scanning line and the gate;

forming a pattern which comprises an active layer, a data line and a spacer matrix on the gate insulating layer;

forming a passivation layer on the pattern which comprises the active layer, the data line and the spacer matrix;

dry etching the passivation layer to form a via hole which exposes the spacer matrix; under effect of an electric field generated between the spacer matrix exposed from the via hole and an etching gas, products obtained during the etching is induced to be deposited on the exposed surface of the spacer matrix so as to form a spacer.

According to a second aspect of the invention, there is provided an array substrate manufactured by the above method, the array substrate comprises a base substrate, a scanning line, a gate, a gate insulating layer, an active layer, a data line, a spacer matrix, a passivation layer, a spacer and a via hole; wherein both the scanning line and the gate are disposed on the base substrate;

the gate insulating layer is disposed on both the scanning line and the gate;

the active layer is disposed on the gate insulating layer;

the data line and the spacer matrix is disposed in the same layer on the active layer;

the passivation layer is disposed on both the data line and the spacer matrix;

the via hole penetrates the passivation layer to expose the spacer matrix;

the spacer is disposed on the exposed spacer matrix.

According to a third aspect of the invention, there is provided a display panel comprising the above array substrate.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solution of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
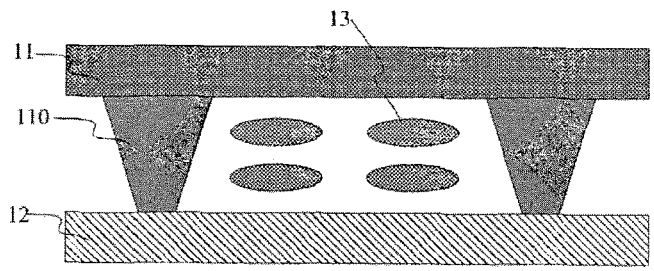
FIG. 1 is a view schematically illustrating a liquid crystal display panel in conventional technology.
Figure 2:
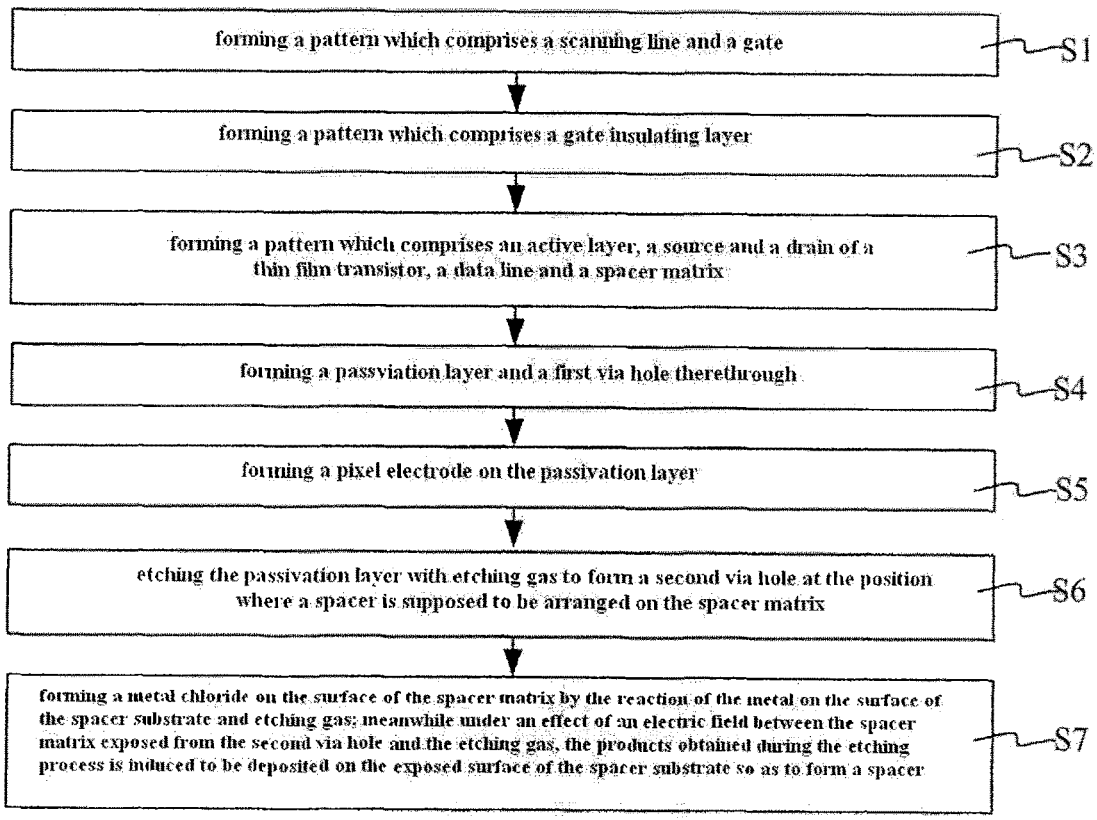
FIG. 2 is a flow chart illustrating a procedure of a method for manufacturing an array substrate provided by an embodiment of the present invention.
Figure 3:
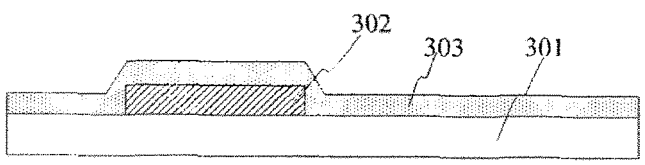
FIG. 3 is a cross-section view schematically illustrating an array substrate after a gate insulating layer is formed thereon.

A method for manufacturing an array substrate provided by an embodiment of the present invention will be described in detail below with reference to FIG. 2. The method comprises following steps:

S1, as shown in FIG. 3, a metal layer, such as molybdenum (Mo), aluminum (Al) or cadmium (Cr) is deposited on a base substrate 301, and then a pattern comprising a gate 302 of a thin film transistor and a scanning line (not shown) is formed by a patterning process, wherein the thin film transistor and the scanning line is deposed in a same layer.

The patterning process only comprises photolithography process. Alternatively, the patterning process comprises photolithography and etching steps, and may further comprise other steps used for forming a predetermined pattern, such as printing, ink jet. The photolithography process refers to a series of processes including coating, exposure, development and the like, by which a pattern is formed using photoresist, mask, exposure machine and the like.

In the embodiment, for example, the patterning process comprises: firstly, forming a layer of metal film on a base substrate 301 (through sputtering or coating), the metal film is used for forming a gate 302 and a scanning line; then, coating a layer of photoresist on the metal film; next, exposing the photoresist by a mask provided with a pattern comprising the gate 302 and the scanning line; finally, forming a pattern comprising the gate 302 and the scanning line by development and etching. In the method for manufacturing the array substrate according to the embodiment, any patterning processes for forming patterns are similar to the process described here, thus, it will not be described in details in the following.

S2, a silicon nitride (SiNx) or silicon oxide (SiOx) layer is deposited on the pattern comprising the gate and the scanning line so as to form a gate insulating layer 303. The gate insulating layer 303 completely covers the gate 302 and the scanning line.

Figure 4:
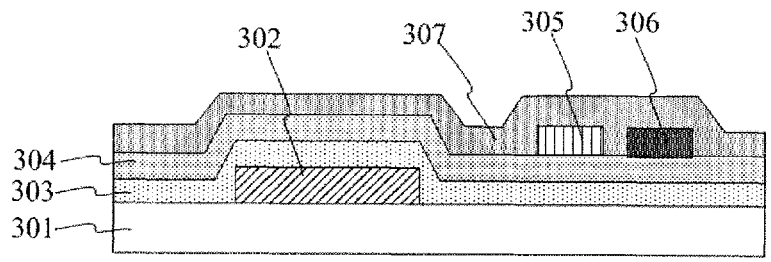
FIG. 4 is a cross-section view schematically illustrating an array substrate after a pixel electrode is formed thereon.
Figure 5:
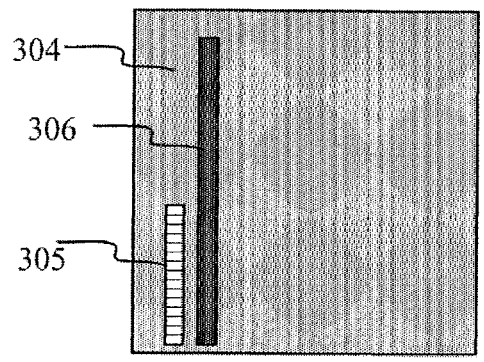
FIG. 5 and FIG. 6 are views schematically illustrating the position of a data line and a spacer matrix respectively.
Figure 6:
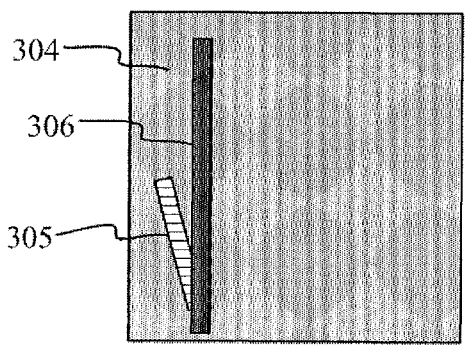

S3, as shown in FIG. 4, a semiconductor film, a doped semiconductor film and a source/drain metal film are deposited on the gate insulating layer 303 in this order. A pattern comprising an active layer 304, source and drain of a thin film transistor (not shown), a data line 305 and a spacer matrix 306 is formed on the gate insulating layer 303 by half-mask technology; wherein the spacer matrix 306 and the data line 305 are disposed in a same layer and in parallel with each other, as shown in FIG. 5; or the spacer matrix 306 and the data line 305 are disposed in a same layer and crossed with each other, as shown in FIG. 6.

Except the rectangle shape shown in FIG. 4, the sectional shape of the spacer matrix 306 can be any one of square, round, triangle and polygon.

It is noted that, the position where the spacer matrix 306 is disposed corresponds to the position where the spacer is supposed to be arranged. Moreover, if the spacer matrix 306 is crossed with the data line 305, the crossing area should not overlap the position of the spacer supposed to be arranged, such that the transmission function of the data line will not be affected.

Figure 7:
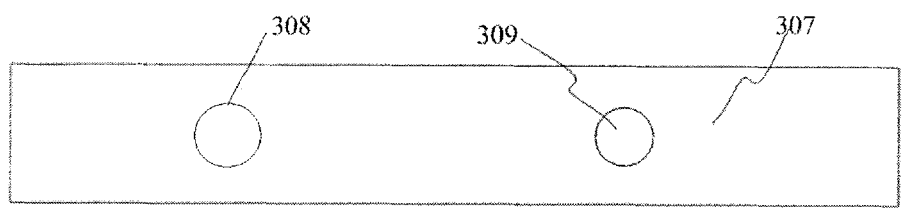
FIG. 7 is a view schematically illustrating a first via hole and a second via hole.

S4, a passivation layer 307 is formed by depositing a silicon nitride or silicon oxide film on the pattern comprising the active layer 304, the source and drain of the thin film transistor, the data line 305 and the spacer matrix 306. And then, referring to FIG. 7, a first via hole 308 (as shown in FIG. 7) is formed on the passivation layer 307 by the processes including photoresist coating, exposing, developing, etching and peeling.

S5, an indium tin oxide (ITO) transparent conductive film is deposited on the passivation layer 307 by magnetron sputtering. The pixel electrode (not shown) is formed by photoresist coating, exposing, developing, wet-etching and peeling. The pixel electrode is connected to the drain of the thin film transistor through the first via hole 308 in the passivation layer 307.

Figure 8:
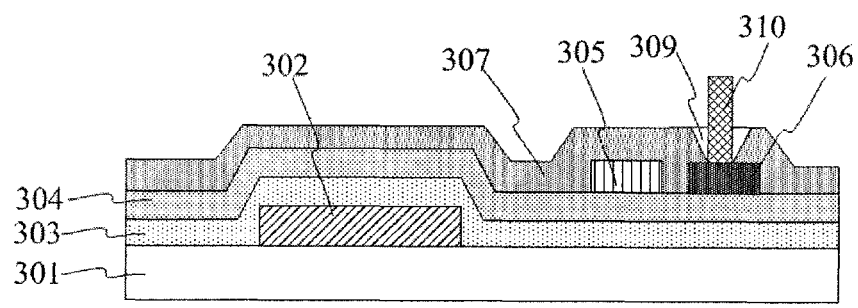
FIG. 8 is a cross-section view schematically illustrating an array substrate provided by an embodiment of the present invention.

S6, referring to FIG. 8, at the location where the spacer is supposed to be arranged above the spacer matrix, the passivation layer 307 is dry-etched to expose the surface of the spacer matrix 306, thus a second via hole 309 penetrating the passivation layer 307 is formed. For example, the step S6 comprises: dry-etching the passivation layer 307 at the location where the spacer is supposed to be arranged by using etching gases containing sulfur hexafluoride gas, chlorine gas and oxygen gas. The oxygen gas contained in the etching gas can increase etching rate and improves etching uniformity.

S7, due to the reaction between the metal in surface of the spacer matrix 306 and the etching gas, a metal chloride is formed on the surface of the spacer matrix 306; at the same time, an electric field is generated between the spacer matrix 306 exposed from the second via hole 309 and the etching gas in the etching chamber during the etching process, under the effect of the electric field, the products obtained from the etching process in the etch chamber is induced to be deposited on the surface of the spacer matrix 306, and then the spacer 310 is formed through crystal growth. The grown spacer 310 has a cylindrical shape and mainly contains SiCl4, which is the product obtained from the reaction between the material of a passivation layer and the etching gas used for etching the second via hole 309. Moreover, the spacer 310 further contains metal chloride obtained from the reaction between the metal in the surface of the spacer matrix 306 and the etching gas.

The height of the spacer 310 can be controlled by the growth rate and the growth duration. In a given growth duration, the height of the spacer increases as the growth rate increases. At a given growth rate, the height of the spacer increases as the growth duration increases.

The growth rate of the spacer 310 depends on growth conditions, and it can be controlled by temperature, pressure and the concentration of the etching gas in the etching chamber. For example, in the embodiment, the growth rate is 150 Å/second (Å/s)–250 Å/s on the condition that: the temperature in chamber ranges from 30° C. to 50° C., the pressure in chamber ranges from 50 Pa to 70 Pa, the flow rate of the sulfur hexafluoride gas ranges from 50 sccm to 200 sccm, the flow rate of the oxygen gas ranges from 100 sccm to 300 sccm, the flow rate of helium gas ranges from 50 sccm to 100 sccm, the flow rate of the chlorine gas ranges from 10 sccm to 50 sccm, and the power applied by the plasma etching equipment ranges from 5000 watt-hour.

Referring to FIG. 7, it is noted that, because other via holes expect for the second via hole 309 (such as the first via hole 308 by which the pixel electrode is connected to the drain) are protected by the indium tin oxide during the dry-etching process, it is impossibility that the spacer is deposited in the other via holes, thus the function of the other via holes are ensured during the etching process.

By using the foregoing steps, the array substrate which has a cross-section view of FIG. 8 according to the embodiment of the present invention is obtained. The array substrate manufactured by the foregoing step is provided with the space, which have advantages of high hardness and unbreakable. The degradation of the display caused by the damage of the spacer can be eliminated, and the display quality of the liquid crystal display can be improved.

The embodiment of the invention provides an array substrate, which comprises a base substrate, a scanning line, a gate, a gate insulating layer, an active layer, a data line, a spacer matrix, a passivation layer, a spacer and a via hole; wherein the scanning line and the gate are disposed on the base substrate;

the gate insulating layer are disposed on both the scanning line and the gate;

the active layer are disposed on the gate insulating layer;

the data line and the spacer matrix are in the same layer and both of them are disposed on the active layer;

the passivation layer is disposed on the layer in which both the data line and the spacer matrix are disposed;

the via hole passes through the passivation layer to expose the spacer matrix;

the spacer is disposed on the exposed spacer matrix.

In an embodiment, the spacer is mainly contains SiCl4, which is a product of the reaction between the passivation layer and the etching gas. The spacer has a shape of cylinder, and it is formed on the exposed spacer matrix in the second via hole. The spacer is used to provide a support so as to prevent abnormal rotation of liquid crystal molecules caused by the deformation.

The spacer matrix and the data line are made of same material. The spacer matrix is arranged in parallel with the data line, or crossed with the data line.

For example, in an example, a cross-section view of the array substrate manufactured by the foregoing step is illustrated in FIG. 8. Referring to FIG. 8, the array substrate comprises a base substrate 301, a gate 302, a gate insulating layer 303, an active layer 304, a data line 305, a spacer matrix 306, a passivation layer 307, a second via hole 309 and a spacer 310. The array substrate father comprises other components not shown in FIG. 8 such as a scanning line, a first via hole, a source, a drain and a pixel electrode.

Specifically, the gate 302 and the scanning line are arranged in the same layer on the base substrate 301.

The gate insulating layer 303 is disposed on both the gate 302 and the scanning line. The gate insulating layer 303, made of silicon nitride (SiNx) or silicon oxide (SiOx), is used to insulate the gate and the scanning line from other layers.

The active layer 304 is disposed on the gate insulating layer 303.

The source, the drain, the data line and the spacer matrix 306 are disposed in same layer, wherein the source and the drain are disposed in same and one layer on the active layer 304 and respectively arranged on opposite sides of the active layer 304. The shape of the spacer matrix 306 is strip. The spacer matrix 306 is disposed in parallel with the data line 305, or crosses with the data line 305. The source, the drain, the data line 305 and the spacer matrix 306 are made of the same material. The material is metallic conductive material, such as molybdenum, aluminum, chrome or copper. The shape of the spacer matrix 306 can be any shape such as square, round, triangle or polygon.

The passivation layer 307 disposed on both the source and the drain is made of silicon nitride or silicon oxide, which is same as the material of the gate insulating layer.

The pixel electrode disposed on the passivation layer 307 is electrically connected to the drain of the thin film transistor through the first via hole formed in passivation layer 307. The pixel electrode is made of the transparent conductive material such as indium tin oxide (ITO).

The second via hole 309 penetrates the passivation layer 307 to expose the surface of the spacer matrix 306.

The spacer 310 is disposed on the exposed surface of the spacer matrix 306 and in the second via hole 309. The spacer 310 has a cylindrical structure. The spacer 310 is mainly contains SiCl4, which is a product of the reaction between the material of the passivation layer and the etching gas used for etching the second via hole 309. Moreover, the material of the spacer further comprises metal chloride, which is a product of the reaction between the metal in the surface of the spacer matrix 306 and the etching gas.

The embodiment of the present invention further provides a display panel which comprises the above array substrate.

In summary, an array substrate, a method for manufacturing the same and a display panel are provided by the embodiments of the present invention. In the method of manufacturing the array substrate, a via hole is formed at the location, where the spacer is supposed to be arranged above the spacer matrix, by dry etching the passivation layer. An electric field is generated between the metal in the surface of the spacer matrix and the etching gas in the reaction chamber when the surface of the spacer matrix is exposed by etching. The products obtained during the etching process are deposited on the surface of the spacer matrix under an effect of the electric field so as to form the spacer. The spacer formed by the method has advantages of higher hardness and unbreakable in comparison of resin material. The deformation of the liquid crystal molecular surrounding the spacer can be avoided and the rotation of the liquid crystal molecular can be ensured so as to increase the display effect of liquid crystal display and pleasure of viewers. In addition, forming the spacer on the array substrate can simplify the manufacturing process of the color filter substrate.

What are described above is related to the illustrative embodiments of the disclosure only and not limitative to the scope of the disclosure; the scopes of the disclosure are defined by the accompanying claims.

The invention claimed is:

1. A method for manufacturing an array substrate comprising:
    forming a pattern which comprises a gate;
    forming a gate insulating layer on the pattern which comprises the gate;
    forming a pattern which comprises an active layer, a data line and a spacer matrix on the gate insulating layer;

forming a passivation layer on the pattern which comprises the active layer, the data line and the spacer matrix;

dry etching the passivation layer to form a via hole which exposes the spacer matrix; under effect of an electric field generated between the spacer matrix exposed from the via hole and an etching gas, products obtained during the etching is induced to be deposited on the exposed surface of the spacer matrix so as to form a spacer.

2. The method according to claim 1, wherein the etching gas comprises sulfur hexafluoride gas, chlorine gas and oxygen gas.

3. The method according to claim 1, wherein a temperature of a reaction chamber used for etching ranges from 30° C. to 50° C., a pressure in the reaction chamber ranges from 50 Pa to 70 Pa, a power applied to a plasma etching apparatus ranges from 5000 W to 9000 W.

4. The method according to claim 1, wherein a material of the spacer contains silicon chloride.

5. An array substrate manufactured by the method according to claim 1, the array substrate comprises: a base substrate, a gate, a gate insulating layer, an active layer, a data line, a spacer matrix a passivation layer, a spacer and a via hole; wherein,
   the gate is disposed on the base substrate;
   the gate insulating layer is disposed on the gate;
   the active layer is disposed on the gate insulating layer;
   the data line and the spacer matrix is disposed in the same layer on the active layer;
   the passivation layer is disposed on both the data line and the spacer matrix;
   the via hole penetrates the passivation layer to expose the spacer matrix;
   the spacer is disposed on and in contact with the exposed spacer matrix,
   wherein the spacer matrix is made of the same material as that of the data line.

6. The method according to claim 2, wherein a flow rate of the sulfur hexafluoride gas ranges from 50 sccm to 200 sccm, a flow rate of the oxygen gas ranges from 100 sccm to 300 sccm; a flow rate of the chlorine gas ranges from 10 sccm to 50 sccm.

7. The method according to claim 2, wherein the etching gas further comprises helium gas, a flow rate of the helium gas ranges from 50 sccm to 100 sccm.

8. The method according to claim 2, wherein a material of the spacer contains silicon chloride.

9. The method according to claim 3, wherein a material of the spacer contains silicon chloride.

10. The method according to claim 4, wherein the material of the spacer further contains metal chloride.

11. The array substrate according to claim 5, wherein a material of the spacer contains silicon chloride.

12. The array substrate according to claim 5, wherein the spacer is in shape of cylinder.

13. The array substrate according to claim 5, wherein the spacer matrix is disposed in parallel with the data line, or the spacer matrix crosses with the data line.

14. A display panel, comprising the array substrate according to claim 5.

15. The method according to claim 6, wherein a material of the spacer contains silicon chloride.

16. The method according to claim 7, wherein a material of the spacer contains silicon chloride.

17. The array substrate according to claim 11, wherein the material of the spacer further contains metal chloride.

18. The array substrate according to claim 11, wherein the spacer is in shape of cylinder.

19. The array substrate according to claim 17, wherein the spacer is in shape of cylinder.

* * * * *